P. WERNI.
Improvement in Devices for Converting Motion.
No. 129,771.          Patented July 23, 1872.
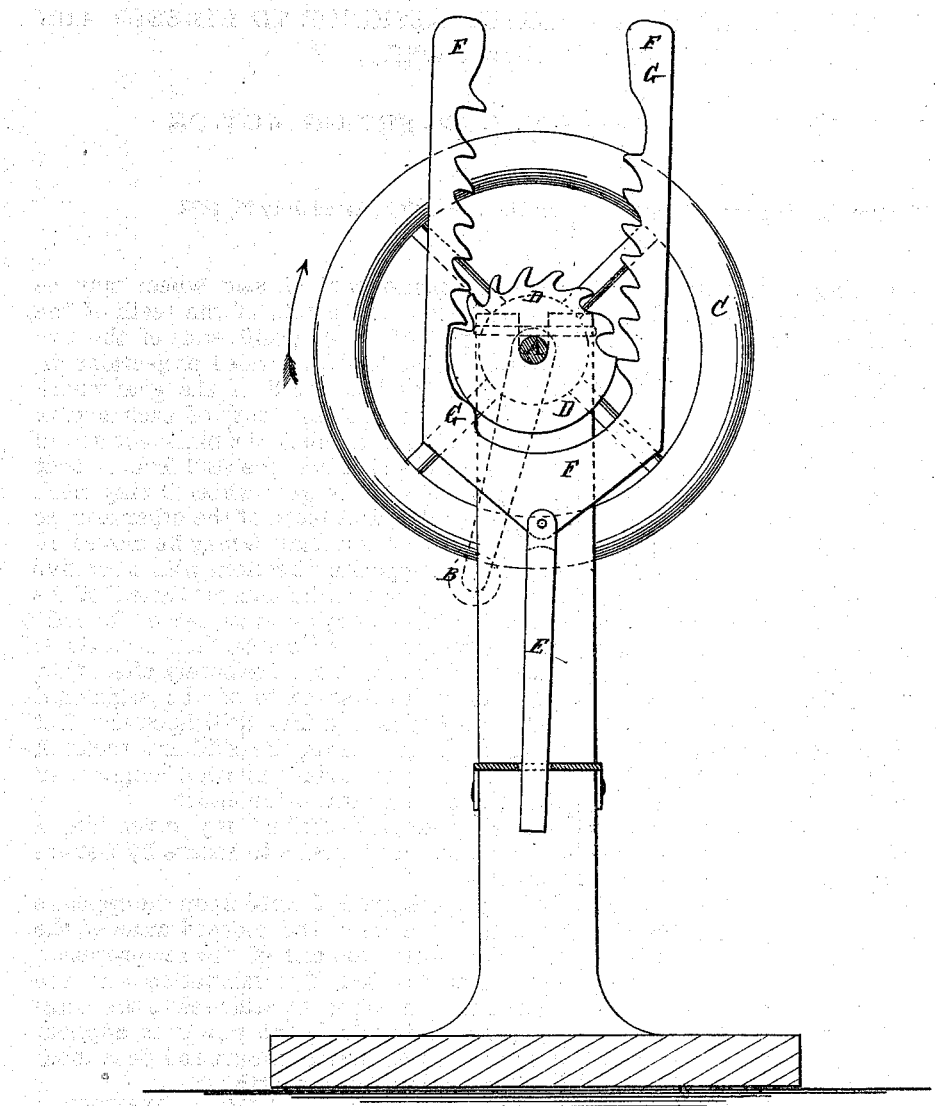

UNITED STATES PATENT OFFICE.

PELAG WERNI, OF ELIZABETH, NEW JERSEY, ASSIGNOR TO HIMSELF AND HENRY CURTISS, OF NEW YORK, N. Y.

IMPROVEMENT IN DEVICES FOR CONVERTING MOTION.

Specification forming part of Letters Patent No. 129,771, dated July 23, 1872.

Specification describing a new and useful Improvement in Device for Converting Rotary into Reciprocating Motion, invented by PELAG WERNI, of Elizabeth, in the county of Union and State of New Jersey.

The figure is a side view of my improved device, a part of the frame-work by which it is supported being removed.

My invention has for its object to furnish an improved device for converting rotary into reciprocating motion which shall be simple in construction and shall move the reciprocating shaft in both directions with a positive movement, without the use of any separate device for shifting at the end of the stroke; and it consists in the construction of various parts of the device as hereinafter more fully described.

A represents the rotating shaft, to which the power is to be applied by a crank, B, a pulley and band, or other device, according to the power by which the machine is to be driven. A fly-wheel, C, should be attached to the shaft A, to give steadiness of motion. To the shaft A is attached a wheel, D, a segment of which is toothed, as shown in the figure, the plane part of said wheel being in the circle of the points of the teeth. E is the reciprocating shaft, the end of which is pivoted to the base of the fork F, upon the inner sides of the arms of which are formed teeth corresponding in form and number with the teeth of the segmental gear-wheel D. The arms of the fork F are arranged at such a distance apart that when the teeth of the said gear-wheel are meshing into the teeth of either arm of said fork the plane part of said wheel may be moving along the points of the teeth of the other arm. At the opposite ends of the two arms of the fork F are formed projections G, which, as the last tooth of the gear-wheel, operates upon the last tooth of each arm of the fork, strikes against the plane surface of said wheel D and moves the said fork, so that the first tooth of the gear-wheel D may mesh firmly with the first tooth of the other arm, so that the fork F and shaft E may be moved alternately in opposite directions with a positive movement by the continuous movement of the shaft A, without any separate device for making the change, there being, thus, nothing to get out of order. To more surely effect this, and cause the first tooth of the segmental gear-wheel to take a firm hold upon the first tooth of the fork-arms, the said first tooth of each fork-arm is made somewhat longer than the others, as shown in the figure.

Having thus described my invention, I claim as new and desire to secure by Letters Patent—

The projections G, formed upon the opposite or alternate ends of the toothed arms of the fork F, to which the end of the reciprocating shaft E is pivoted, in combination with the segmental gear-wheel D, attached to the rotating shaft A, to which the power is applied, substantially as herein shown and described, and for the purpose set forth.

PELAG WERNI.

Witnesses:
 JAMES T. GRAHAM,
 T. B. MOSHER.